UNITED STATES PATENT OFFICE.

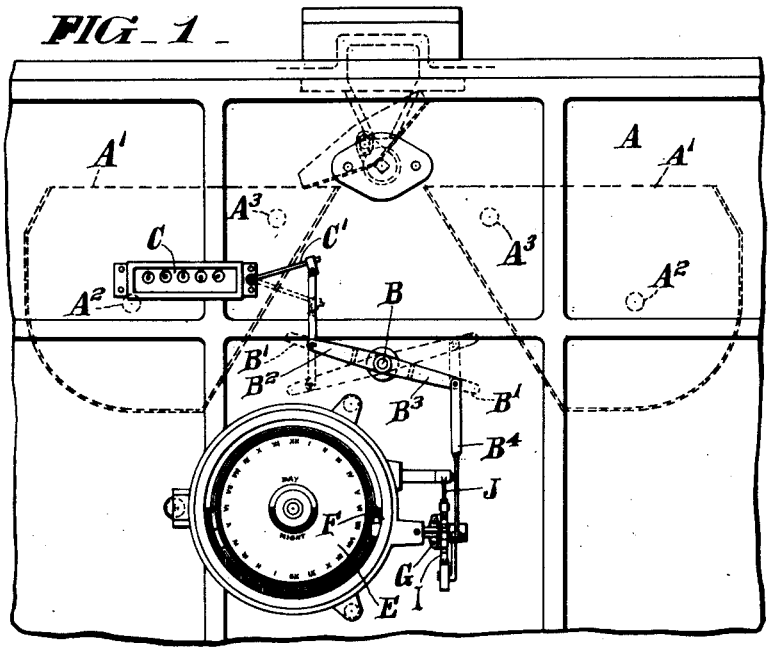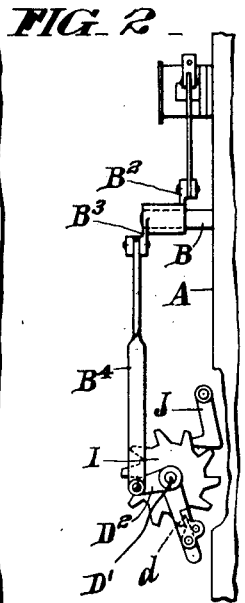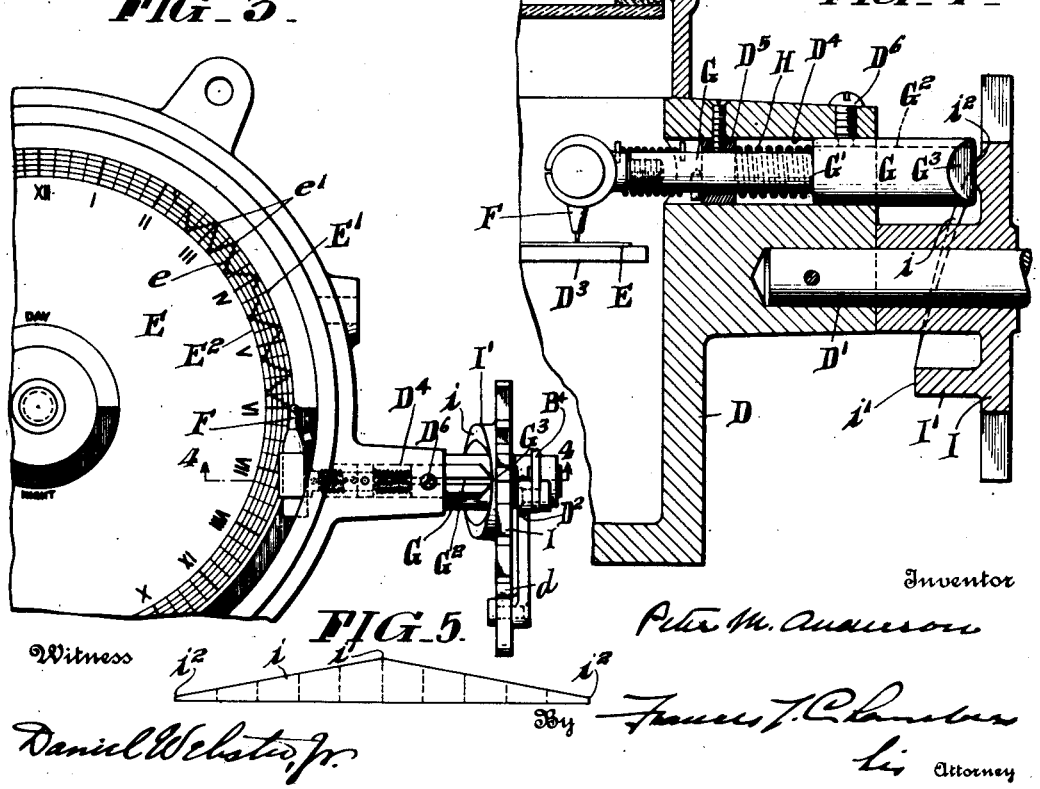

PETER M. ANDERSON, OF WASHINGTON, DISTRICT OF COLUMBIA, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS UNDER THE NAME OF HARRISON SAFETY BOILER WORKS.

RECORDING INSTRUMENT.

1,314,179.  Specification of Letters Patent.  Patented Aug. 26, 1919.

Application filed January 16, 1917. Serial No. 142,614.

*To all whom it may concern:*

Be it known that I, PETER M. ANDERSON, a citizen of the United States of America, and a resident of Washington, District of Columbia, have invented certain new and useful Improvements in Recording Instruments, of which the following is a true and exact description, reference being had to the accompanying drawings, which form a part thereof.

My present invention relates to recording instruments and particularly to recording instruments of the type in which a recording pen or marker is employed to make, on a traveling record surface having a timed movement, a record of the frequency of occurrence of an intermittently occurring event; and the object of the invention is to provide means for giving the pen or other marking point a certain novel movement relative to the record surface, for the purpose of creating a resultant record which will show the frequency of the happenings recorded in a desirable, clear and legible manner. The various features of novelty which characterize my invention are pointed out with particularity in the claim annexed to and forming a part of this specification. For a better understanding of the invention, however, and the advantages possessed by it, reference should be had to the accompanying drawings, in which I have illustrated a preferred embodiment of my invention.

Of the drawings:

Figure 1 is an elevation of a portion of a meter equipped with my improved recording device;

Fig. 2 is a partial elevation taken at right angles to Fig. 1;

Fig. 3 is an enlarged view of a portion of a recording mechanism proper shown in Fig. 1;

Fig. 4 is a partial section taken on the line 4—4 of Fig. 3; and

Fig. 5 is a developed view of a cam employed.

In the drawings, I have illustrated the use of my improved recording instrument in connection with the meter A of the general type shown in my co-pending application, Serial No. 86,324, filed March 23, 1916. In this meter, there are two similar tilting receptacles $A'$ each of which turns, when filled, about its supporting axis $A^2$ to discharge. To register and record the number of times the receptacles fill and empty, a rock shaft B is journaled in the casing of the meter and is provided internally of the casing with oppositely extending arms $B'$ which are engaged by projections $A^3$ carried by the receptacles $A'$. In the position shown in full lines in Fig. 1, the right hand bucket or receptacle $A'$ was the last to discharge. When the left hand bucket fills and tilts to the discharge position, the projection $A^3$, carried by this bucket, will engage the left hand arm $B'$ and swing the rock shaft B with its arms into the position shown in dotted lines in Fig. 1. As soon as the left hand bucket is empty, it swings back into the position shown. The shaft B and parts carried thereby will remain in the dotted line position until the right hand bucket is filled and turns into the discharge position. When this occurs, the projections $A^3$ carried by the right hand bucket $A'$ engage the right hand arm $B'$ and return the latter to the position shown in full lines in Fig. 1. Externally of the meter casing, the rock shaft B carries the arm $B^2$ which is link-connected to the operating arm $C'$ of a suitable register C. A second arm $B^3$ carried by the rock shaft B is connected by a link $B^4$ to the operating element $D^2$ of the recording mechanism proper.

The recording mechanism proper comprises a casing D in which is secured a stud or shaft $D'$, on the outer end of which the oscillating element $D^2$ is journaled. Within the casing D is mounted the continuously rotating clock-driven table $D^3$, on which is secured a record sheet E. A record is traced on the record sheet E by a pen F, which may be and is shown as of a kind commonly employed in recording instruments of this type. This pen is carried at the inner end of a rod G which is slidingly mounted in the passage $D^4$ formed in the instrument casing. A spring H acting between a shoulder $G'$ on the rod G and a bushing $D^5$ secured in the passageway $D^4$ tends to force the member G outward through the passageway $D^4$. A screw $D^6$, having its inner end projecting into a slot formed in the member G, prevents the member G from rotating in the passageway G. The beveled off outer end of the member G bears against an annular cam surface $i$ formed by the edge of a cylindrical flange-like projection I' carried by a tooth wheel I journaled on the stud D'. The oscillating element $D^2$, actuated by the rock shaft B, carries a pawl $d$ adapted to engage the adjacent tooth of the wheel I and give the latter angular advance equal to the pitch of the teeth each time the link $B^4$ is elevated. On the reverse movement of the rock shaft B, the pawl $d$ is returned to the position shown in Fig. 2, in position to engage a succeeding tooth of the wheel I when the rock shaft B is again oscillated. A pawl J engages the teeth of the wheel I to prevent any backward movement of the wheel I. The cam surface $i$ slopes uniformly in both directions from the high point $i'$ to the low point $i^2$. This is clearly shown by Fig. 5 which is a developed view of the cam.

Conveniently, as shown, the wheel I has ten teeth and in a complete rotation of the wheel starting from the position shown in Figs. 3 and 4, the pen will be moved from the outer boundary E' of the zone traversed by the pen to the inner boundary $E^2$ of that zone in five successive steps, and will then return to the outer margin of the zone in five following steps. The time interval between successive steps of the pen toward or away from the center of the record sheet will vary, of course, with the frequency with which the measuring receptacles fill and empty, but whether the intervals between successive discharge movements of the receptacles be short or more prolonged, the effect of these necessarily intermittent movements of the pen combined with the continuous movement of the record sheet is to produce a zigzag record line $e$. This line is of such a character that the successive movements of the pen produced by the meter may be readily seen and counted even though the time interval between the successive pen movements is so small that if the pen were merely moved back and forth in the same path each time the two buckets filled and emptied, the record traced would be a blurred line from which it would be difficult, if not impossible, to decipher the individual pen movements. It will be readily apparent from Fig. 3 that a computation from the record sheet is facilitated by the fact that each peak $e'$ of the curve $e$ represents ten oscillations of the meter rock shaft B.

While in accordance with the provisions of the statutes, I have illustrated and described the best forms of my invention now known to me, it will be apparent to those skilled in the art that changes can be made in the form of my invention without departing from its spirit and some features can be changed without a corresponding change of other features.

Having now described my invention, what I claim as new and desire to secure by Letters Patent, is:—

In combination with mechanism embodying elements designed to have a regular periodic movement, a recording instrument adapted to graphically record such movements and to show the relative time and speed of each such periodic movement with respect to the others, said recording instrument comprising a clock driven traveling record surface, a machine element held in constant contact with said surface so as to mark thereon its relative movements, a rotating cam connected to move the marking element to and fro over the record surface and actuating means whereby the periodically moving elements aforesaid impart rotative movement to the cam, said actuating means and the throw of the cam being such as to cause the marking element to traverse the record surface by separate step by step movements, each of sufficient magnitude as to be clearly depicted on the record surface and to form thereon a zigzag record clearly showing each movement of the periodically moving elements.

PETER M. ANDERSON.